United States Patent
Chen et al.

(10) Patent No.: US 10,200,948 B2
(45) Date of Patent: Feb. 5, 2019

(54) METHOD AND DEVICE FOR CONTROLLING ENERGY SAVING AND COMPENSATION

(71) Applicant: ZTE Corporation, Shenzhen (CN)

(72) Inventors: Liping Chen, Shenzhen (CN); Weihong Zhu, Shenzhen (CN); Jianmin Fang, Shenzhen (CN)

(73) Assignee: XI'AN ZHONGXING NEW SOFTWARE CO., LTD., Xi'an (CN)

(*) Notice: Subject to any disclaimer, the term of this patent is extended or adjusted under 35 U.S.C. 154(b) by 92 days.

(21) Appl. No.: 15/305,426

(22) PCT Filed: May 29, 2014

(86) PCT No.: PCT/CN2014/078837
§ 371 (c)(1),
(2) Date: Oct. 20, 2016

(87) PCT Pub. No.: WO2015/161542
PCT Pub. Date: Oct. 29, 2015

(65) Prior Publication Data
US 2017/0041870 A1 Feb. 9, 2017

(30) Foreign Application Priority Data
Apr. 22, 2014 (CN) .......................... 2014 1 0163469

(51) Int. Cl.
*H04W 52/02* (2009.01)
*H04W 24/08* (2009.01)
(Continued)

(52) U.S. Cl.
CPC ....... *H04W 52/0206* (2013.01); *H04W 24/08* (2013.01); *H04W 52/02* (2013.01);
(Continued)

(58) Field of Classification Search
CPC . H04W 52/0206; H04W 92/20; H04W 52/02; H04W 16/08; H04W 16/10;
(Continued)

(56) References Cited

U.S. PATENT DOCUMENTS

2013/0095842 A1 4/2013 Jia
2013/0150044 A1* 6/2013 Zhang ............... H04W 52/0258
455/436
(Continued)

FOREIGN PATENT DOCUMENTS

CN 102065448 A 5/2011
CN 102238707 A 11/2011
(Continued)

OTHER PUBLICATIONS

"3rd Generation Partnership Project: Technical Specification Group and Systems Aspect", vol. SA WG5, No. V11.7.0, Sep. 19, 2013, pp. 1-58, XP050712649.
(Continued)

*Primary Examiner* — Fred A Casca
(74) *Attorney, Agent, or Firm* — Cantor Colburn LLP

(57) ABSTRACT

The disclosure discloses a method and device for controlling energy saving and compensation. The method for controlling energy saving and compensation includes that: cell load measurement results of all cells in an energy saving and compensation group are acquired, the energy saving and compensation group including energy saving cells and compensation cells; and according to the cell load measurement results and an energy saving and compensation policy, at least one cell in the energy saving and compensation group are controlled to enter or quit energy saving. By means of the disclosure, energy saving and compensation can be globally controlled, thereby reducing the complexity of determining energy saving and compensation cells.

18 Claims, 7 Drawing Sheets

(51) Int. Cl.
*H04W 88/08* (2009.01)
*H04W 16/00* (2009.01)
*H04W 28/02* (2009.01)
(52) U.S. Cl.
CPC ........ *H04W 16/00* (2013.01); *H04W 28/0221* (2013.01); *H04W 88/08* (2013.01); *Y02D 70/00* (2018.01)
(58) Field of Classification Search
CPC ..... H04W 28/08; H04W 36/16; H04W 16/24; H04W 84/18; H04W 88/08; H04W 92/12
USPC .............................. 455/446, 453, 422.1, 424
See application file for complete search history.

(56) References Cited

U.S. PATENT DOCUMENTS

| | | | | |
|---|---|---|---|---|
| 2013/0194989 | A1* | 8/2013 | Centonza | H04W 52/0206 370/311 |
| 2013/0294272 | A1 | 11/2013 | Xiao | |
| 2016/0044554 | A1* | 2/2016 | Comstock | H04W 52/0254 370/311 |

FOREIGN PATENT DOCUMENTS

| | | |
|---|---|---|
| CN | 102316512 A | 1/2012 |
| CN | 102387570 A | 3/2012 |
| CN | 102625337 A | 8/2012 |
| CN | 103024880 A | 4/2013 |
| EP | 2663131 A1 | 11/2013 |

OTHER PUBLICATIONS

"3rd Generation Partnership Project: Technical Specification Group Radio Access Network", vol. RAN, No. V1.0.0, Mar. 3, 2014, pp. 1-26, XP050769601.
"3rd Generation Partnership Project: Technical Specification Group Services and Systems Aspects; Telecommunication Management", vol. SA WG5, No. V11.3.1, Jun. 28, 2013, pp. 1-26, XP050711973.
European Search Report for corresponding application EP 14 88 9981; Report dated Mar. 20, 2017.
International Search Report for corresponding application PCT/CN2014/078837 filed on May 29, 2014; dated Jan. 26, 2015.

* cited by examiner understand# METHOD AND DEVICE FOR CONTROLLING ENERGY SAVING AND COMPENSATION

TECHNICAL FIELD

The disclosure relates to the communications field, and in particular to a method and device for controlling energy saving and compensation.

BACKGROUND

A capacity-limited network is usually customized in accordance with a demand for handling peak traffic. Thus, network resources will be poorly utilized in a period where an off-peak traffic occurs. For example, a total traffic in some periods at night and traffics scattered in different cells are greatly different from the peak traffic. For the energy saving of these networks, some cells can keep started in a period where a traffic demand is lower, and other cells enter energy saving states; and meanwhile, a coverage range of the former is enlarged to cover an area originally governed by the latter, and loads are gathered in these cells keeping started.

FIG. 1 is a schematic diagram of energy saving and compensation according to the related art. As shown in FIG. 1, a Cell 1, a Cell 2 and a Cell 3 are cells with lower off-peak traffics. In order to achieve a aim of energy saving, coverage ranges of a Cell 4, a Cell 5 and a Cell 6 can be enlarged to enter compensation states, so as to make these cells cover governed areas of the Cell 1, the Cell 2 and the Cell 3. Thus, the Cell 1, the Cell 2 and the Cell 3 can enter energy saving states.

Most of solutions in the related art, dynamically determine, by an evolved Node B (eNB), cells entering energy saving states and cells entering energy saving and compensation states according to cell loads. Although the eNB is a first network element capable of knowing cell load situations, it is very difficult for the eNB to measure and evaluate an energy saving effect. Because a energy consumption of energy saving cells is reduced while a energy consumption of compensation cells is increased and all of the energy saving cells and all of the compensation cells may probably belong to different eNBs, a dynamic determination method is more complex.

An effective solution has not been proposed yet at present for a problem in the related art that a total energy consumption of energy saving cells and compensation cells cannot be globally controlled.

SUMMARY

The embodiments of the disclosure provide a method and device for controlling energy saving and compensation, which are intended to at least solve a problem in the related art that an energy consumption of energy saving cells and compensation cells cannot be globally controlled.

In one embodiment of the disclosure, a method for controlling energy saving and compensation is provided, which may include that:

acquiring cell load measurement results of all cells in an energy saving and compensation group, wherein the energy saving and compensation group includes energy saving cells and compensation cells; and controlling, according to the cell load measurement results and an energy saving and compensation policy, at least one cell in the energy saving and compensation group to enter or quit energy saving.

In an example embodiment, acquiring the cell load measurement results of all the cells in the energy saving and compensation group includes: sending a cell load measurement job to the energy saving and compensation group; and receiving the cell load measurement results reported in response to the cell load measurement job.

In an example embodiment, the method further includes: acquiring information about the energy saving and compensation group, the information including: an identifier of the energy saving and compensation group, identifiers of the energy saving cells, identifiers of the compensation cells, and a state of the energy saving and compensation group.

In an example embodiment, before acquiring the cell load measurement results of all the cells in the energy saving and compensation group, the method further includes: configuring the energy saving and compensation group, and determining cells serving as the energy saving cells and cells serving as the compensation cells in the energy saving and compensation group.

In an example embodiment, the energy saving and compensation policy includes: a load threshold, enabling each energy saving cell to enter an energy saving state, wherein a corresponding load threshold enabling to enter the energy saving state is set for each energy saving cell; a load threshold, enabling each compensation cell to enter a compensation state, wherein a corresponding load threshold enabling to enter the compensation state is set for each compensation cell; a load threshold, enabling each compensation cell to quit the compensation state, wherein a corresponding load threshold enabling to quit the compensation state is set for each compensation cell; and a configuration parameter of each compensation cell in the compensation state.

In an example embodiment, the configuration parameter of each compensation cell in the compensation state includes: at least one of transmitting power, an antenna inclination angle, an antenna height, a neighbour list and a new Evolved universal terrestrial radio access network Cell Global Identifier (ECGI) in the compensation state; and/or a new network management identifier (DN) of each compensation cell.

In an example embodiment, controlling the cells in the energy saving and compensation group to enter or quit energy saving according to the cell load measurement results and the energy saving and compensation policy includes: when a state of the energy saving and compensation group is a non-energy saving state, determining that cell load values of all the energy saving cells are lower than the corresponding load thresholds enabling the energy saving cells entering the energy saving states and cell load values of all the compensation cells are lower than the corresponding load thresholds enabling the compensation cells entering the compensation states; and controlling the cells in the energy saving and compensation group to enter energy saving, and setting the state of the energy saving and compensation group as the energy saving state.

In an example embodiment, controlling the cells in the energy saving and compensation group to enter or quit energy saving according to the cell load measurement results and the energy saving and compensation policy includes: when the state of the energy saving and compensation group is the energy saving state, determining that the cell load values of all the compensation cells are lower than the corresponding load thresholds enabling the compensation cells to quit the compensation states; and otherwise, controlling the cells in the energy saving and compensation group to quit energy saving, and setting the state of the energy saving and compensation group as the non-energy saving state.

In an example embodiment, controlling the cells in the energy saving and compensation group to enter energy saving includes: controlling all the energy saving cells to enter the energy saving states, and controlling all the compensation cells to enter the compensation states; and/or controlling the cells in the energy saving and compensation group to quit energy saving includes: controlling all the energy saving cells to quit the energy saving states, and controlling all the compensation cells to quit the compensation states.

In another embodiment of the disclosure, an device for controlling energy saving and compensation is provided, which may include:

an acquisition component, configured to acquire cell load measurement results of all cells in an energy saving and compensation group, wherein the energy saving and compensation group includes energy saving cells and compensation cells; and a control component, configured to control, according to the cell load measurement results and an energy saving and compensation policy, at least one cell in the energy saving and compensation group to enter or quit energy saving.

In an example embodiment, the acquisition component includes: a sending element, configured to send a cell load measurement job to the energy saving and compensation group; and a receiving element, configured to receive the cell load measurement results reported in response to the cell load measurement job.

In an example embodiment, the acquisition component is further configured to: acquire information about the energy saving and compensation group, the information including: an identifier of the energy saving and compensation group, identifiers of the energy saving cells, identifiers of the compensation cells, and a state of the energy saving and compensation group.

In an example embodiment, the method further includes: a configuration component, configured to configure the energy saving and compensation group, and determine cells serving as the energy saving cells and cells serving as the compensation cells in the energy saving and compensation group.

In an example embodiment, the energy saving and compensation policy includes: a load threshold, enabling each energy saving cell to enter an energy saving state, wherein a corresponding load threshold enabling to enter the energy saving state is set for each energy saving cell; a load threshold, enabling each compensation cell to enter a compensation state, wherein a corresponding load threshold enabling to enter the compensation state is set for each compensation cell; a load threshold, enabling each compensation cell to quit the compensation state, wherein a corresponding load threshold enabling to quit the compensation state is set for each compensation cell; and a configuration parameter of each compensation cell in the compensation state.

In an example embodiment, the configuration parameter of each compensation cell in the compensation state includes: at least one of transmitting power, an antenna inclination angle, an antenna height, a neighbour list and a new Evolved universal terrestrial radio access network Cell Global Identifier (ECGD in the compensation state; and/or a new network management identifier (DN) of each compensation cell.

In an example embodiment, the control component includes: a first determination element, configured to determine, when a state of the energy saving and compensation group is a non-energy saving state, that cell load values of all the energy saving cells are lower than the corresponding load thresholds enabling the energy saving cells entering the energy saving states and cell load values of all the compensation cells are lower than the corresponding load thresholds enabling the compensation cells entering the compensation states; and a first control element, configured to control the cells in the energy saving and compensation group to enter energy saving, and set the state of the energy saving and compensation group as the energy saving state.

In an example embodiment, the control component includes: a second determination element, configured to determine, when the state of the energy saving and compensation group is the energy saving state, that the cell load values of all the compensation cells are lower than the corresponding load thresholds enabling the compensation cells to quit the compensation states; and a second control element, configured to control, when the conditions of the second determination element are not satisfied, the cells in the energy saving and compensation group to quit energy saving, and set the state of the energy saving and compensation group as the non-energy saving state.

In an example embodiment, controlling the cells in the energy saving and compensation group to enter energy saving includes: controlling all the energy saving cells to enter the energy saving states, and controlling all the compensation cells to enter the compensation states; and/or controlling the cells in the energy saving and compensation group to quit energy saving includes: controlling all the energy saving cells to quit the energy saving states, and controlling all the compensation cells to quit the compensation states.

By means of the embodiments of the disclosure, cell load measurement results of all cells in an energy saving and compensation group are acquired, the energy saving and compensation group including energy saving cells and compensation cells; and according to the cell load measurement results and an energy saving and compensation policy, at least one cell in the energy saving and compensation group are controlled to enter or quit energy saving. Energy saving and compensation can be globally controlled, thereby reducing the complexity of determining energy saving and compensation cells.

BRIEF DESCRIPTION OF THE DRAWINGS

The drawings illustrated herein are used to provide further understanding of the disclosure, and form a part of the disclosure. The schematic embodiments and illustrations of the disclosure are used to explain the disclosure, and do not form improper limits to the disclosure. In the drawings.

DETAILED DESCRIPTION OF THE EMBODIMENTS

The disclosure will be illustrated below with reference to the drawings and in conjunction with the embodiments in detail. It needs to be noted that the embodiments of the disclosure and the characteristics in the embodiments can be combined under the condition of no conflicts.

Figure 1:
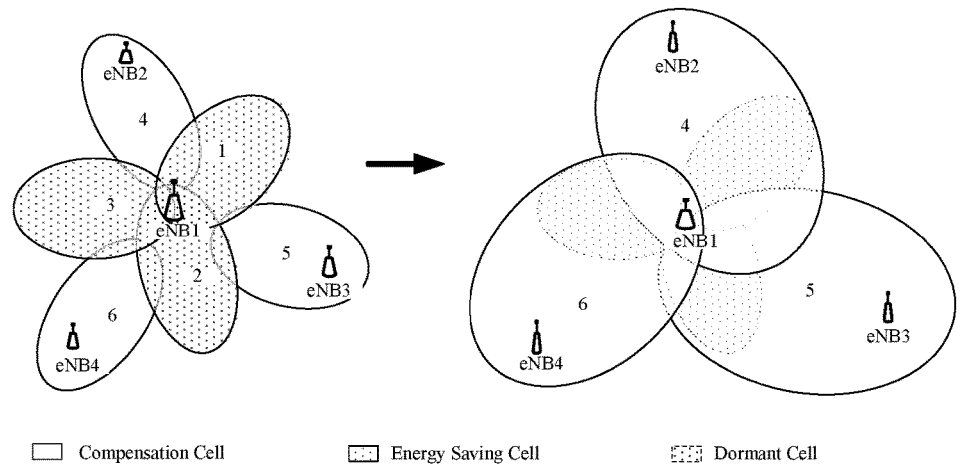
FIG. 1 is a schematic diagram of energy saving and compensation according to the related art.
Figure 2:
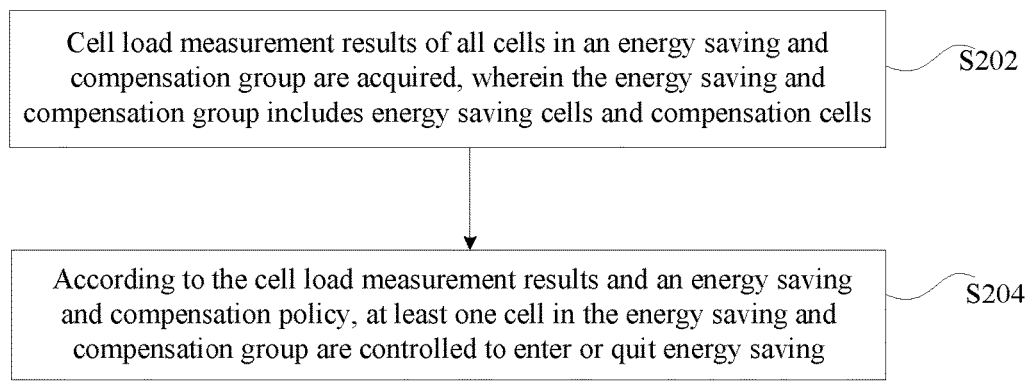
FIG. 2 is a flowchart of a method for controlling energy saving and compensation according to an embodiment of the disclosure.

FIG. 2 is a flowchart of a method for controlling energy saving and compensation according to an embodiment of the disclosure. As shown in FIG. 2, the method includes Step S202 to Step S204.

Step S202: Cell load measurement results of all cells in an energy saving and compensation group are acquired, wherein the energy saving and compensation group includes energy saving cells and compensation cells.

Step S204: According to the cell load measurement results and an energy saving and compensation policy, at least one cell in the energy saving and compensation group are controlled to enter or quit energy saving.

By means of the embodiments of the disclosure, cell load measurement results of all cells in an energy saving and compensation group are acquired, and according to the cell load measurement results and an energy saving and compensation policy, the at least one cell in the energy saving and compensation group are controlled to enter or quit energy saving, such that energy saving and compensation can be globally controlled, thereby reducing the complexity of determining energy saving and compensation cells.

In one implementation of the embodiments of the disclosure, the step that controlling the cells in the energy saving and compensation group to enter energy saving includes that: controlling all the energy saving cells to enter energy saving states, and controlling all the compensation cells to enter compensation states; and/or, the step that controlling the cells in the energy saving and compensation group to quit energy saving includes that: controlling all the energy saving cells to quit the energy saving states, and controlling all the compensation cells to quit the compensation states.

Optionally, when the compensation cells enter the compensation states, the compensation cells cover the range of the energy saving cells, the energy saving cells enter the energy saving states and may not cover an originally covered range, and for example, energy is saved by means of a mode of reducing transmitting power and the like. In an existence of a plurality of energy saving cells and a plurality of compensation cells, it can be set that certain compensation cells cover a range of certain energy saving cells.

In one implementation of the embodiments of the disclosure, the step that the cell load measurement results of all the cells in the energy saving and compensation group are acquired includes: a cell load measurement job can be sent to the energy saving and compensation group, and the cell load measurement results reported in response to the cell load measurement job are received. However, the step is not limited thereto. For example, the actively-reported cell load measurement results can be received.

In one implementation of the embodiments of the disclosure, a cell load measurement job can be sent to an eNB corresponding to each cell. After receiving the cell load measurement job, each eNB can measure a cell load (which may have been previously measured, certainly) and report a cell load measurement result.

In the embodiments of the disclosure, the cell measurement job can be directly sent to each eNB, or the cell measurement job can be sent by means of an Element Management System (EMS). However, the step is not limited thereto. In the case where all the eNBs belong to different EMSs, a cell load measurement result can be directly received by means of each EMS, a main EMS can be set in a plurality of EMSs, and the main EMS can receive cell load measurement results reported by other EMSs and report the received cell load measurement results and an own cell load measurement result.

In the embodiments of the disclosure, each eNB can periodically perform measurement and report the cell load measurement result. That is, in the embodiments of the disclosure, the eNBs can actively report the measurement results, or each eNB can be actively requested to report the measurement result. Certainly, after being actively requested, each eNB can report the cell load measurement result for many times.

The embodiments of the disclosure do not limit acquisition modes for the cell load measurement results. Any modes, predictable by those skilled in the art, of acquiring the cell load measurement result of each eNB are allowed.

The cell load measurement results can be represented by parameters in the related art, which is not limited in the embodiments of the disclosure. Those skilled in the art can determine the parameters for representing cell loads with reference to related communication standards and communication technologies in conjunction with actually required or actually applied systems.

In one implantation of the embodiments of the disclosure, information about the energy saving and compensation group can also be acquired. The information may include, but is not limited to, an identifier of the energy saving and compensation group, identifiers of the energy saving cells, identifiers of the compensation cells, and a state of the energy saving and compensation group. Information about the energy saving cells and information about the compensation cells are used for indicating which cells in the energy saving and compensation group are the energy saving cells and which cells are the compensation cells. Optionally, the information can be provided by means of a list such as an energy saving cell list and a compensation cell list. Identifiers of cells may be CGIs of cells.

In one implantation of the embodiments of the disclosure, before the cell load measurement results of all the cells in the energy saving and compensation group are acquired, the energy saving and compensation group can also be configured, and cells serving as the energy saving cells and cells serving as the compensation cells in the energy saving and compensation group are determined.

Optionally, cells capable of entering the energy saving states, cells capable of entering the compensation states and an energy saving and compensation coverage range in an off-peak situation can be determined in network planning and optimization according to distribution situations, including a time dimension, a geographic position dimension and other aspects, of each cell load in an area on a premise of ensuring that the total energy consumption in the area is reduced. That is, cells serving as the energy saving cells and cells serving as the compensation cells can be pre-set; and when conditions are satisfied, the energy saving cells enter the energy saving states, the compensation cells enter the compensation states, and the compensation cells cover the range covered by the energy saving cells.

In one implantation of the embodiments of the disclosure, the energy saving and compensation policy may include: a load threshold, enabling each energy saving cell to enter an energy saving state, wherein a corresponding load threshold enabling to enter the energy saving state is set for each energy saving cell; a load threshold, enabling each compensation cell to enter a compensation state, wherein a corresponding load threshold enabling to enter the compensation state is set for each compensation cell; a load threshold, enabling each compensation cell to quit the compensation state, wherein a corresponding load threshold enabling to quit the compensation state is set for each compensation cell; and a configuration parameter of each compensation cell in the compensation state.

In the embodiments of the disclosure, the corresponding load thresholds which enable to enter the energy saving states and are set for all the energy saving cells may be identical or different, the corresponding load thresholds which enable to enter the compensation states and are set for all the compensation cells may be identical or different, and the corresponding load thresholds which enable to quit the compensation states and are set for all the compensation cells may be identical or different.

In one implantation of the embodiments of the disclosure, the configuration parameter includes: at least one of transmitting power, an antenna inclination angle, an antenna height, a neighbour list and a new ECGI in the compensation state; and/or a new network management identifier (DN) of each compensation cell.

In one implantation of the embodiments of the disclosure, in Step S204, when the state of the energy saving and compensation group is a non-energy saving state, it is determined that cell load values of all the energy saving cells are lower than the corresponding load thresholds enabling the energy saving cells to enter the energy saving states and cell load values of all the compensation cells are lower than the corresponding load thresholds enabling the compensation cells to enter the compensation states; and the cells in the energy saving and compensation group can be controlled to enter energy saving, and the state of the energy saving and compensation group is set as the energy saving state. An initial state of the energy saving and compensation group is the non-energy saving state.

In one implantation of the embodiments of the disclosure, in Step S204, when the state of the energy saving and compensation group is the energy saving state, it is determined that the cell load values of all the compensation cells are lower than the corresponding load thresholds enabling the compensation cells to quit the compensation states; and otherwise, the cells in the energy saving and compensation group can be controlled to quit energy saving, and the state of the energy saving and compensation group is set as the non-energy saving state.

In one implantation of the embodiments of the disclosure, the step that the cells in the energy saving and compensation group enter energy saving includes that: all the energy saving cells enter the energy saving states, and all the compensation cells enter the compensation states; and/or, the step that the cells in the energy saving and compensation group quit energy saving includes that: all the energy saving cells quit the energy saving states, and all the compensation cells quit the compensation states. Initial states of the energy saving cells and the compensation cells are the non-energy saving states.

Optionally, the method of the embodiments of the disclosure can be executed in the main EMS, or can be executed in a Network Management System (NMS). However, execution is not limited thereto. For example, an independent equipment or device can be set to execute the above method.

Figure 3:
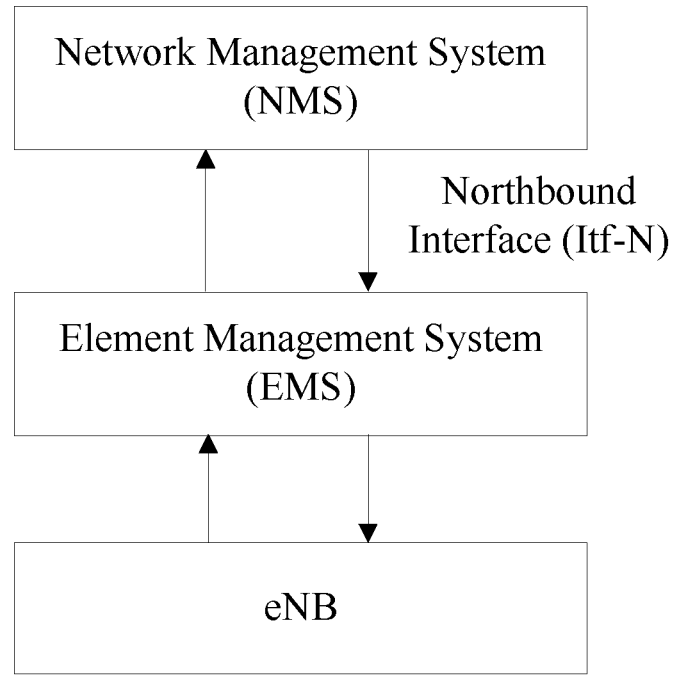
FIG. 3 is a schematic diagram of a hierarchical structure of a Telecommunications Management Network (TMN) based on an International Telegraph Union (ITU)

FIG. 3 is a schematic diagram of a hierarchical structure of an ITU-based TMN. As shown in FIG. 3, the structure includes an NMS and an EMS, wherein the NMS mainly manages all network elements in a managed network, the EMS mainly manages one or more network elements, and these network elements come from, but are not limited to, an identical device supplier usually. An interface between the NMS and the EMS is a Northbound Interface (Itf-N), which can be mapped to a management entity of a $3^{rd}$ Generation Partnership Project (3GPP) by standardization, the NMS is equivalent to an Integrated Reference Point Manager (IRP-Manager) in a 3GPP specification, and the EMS is equivalent to an IRPAgent.

In one implantation of the embodiments of the disclosure, a cell load measurement job can be sent to each eNB by means of the EMS. Before the EMS sends the cell load measurement job to each eNB, information about an energy saving and compensation group can also be sent to the EMS, the information including: an identifier of the energy saving and compensation group, identifiers of energy saving cells and identifiers of compensation cells.

After receiving the cell load measurement job and the information about the energy saving and compensation group, the EMS can send the cell load measurement job to each eNB, and each eNB performs measurement and reports a cell load measurement result.

Optionally, the cell load measurement result of each eNB can be received by means of the EMS. In the embodiments of the disclosure, in the case that all the eNBs belong to different EMSs may probably exist. In the embodiments of the disclosure, it is illustrated with an example that each eNB belongs to two EMSs.

Under the situation that all the eNBs belong to different EMSs, the cell load measurement job and the information about the energy saving and compensation group can be sent to the EMSs corresponding to each eNB respectively, and the cell load measurement result reported by each EMS can be received.

Optionally, an EMS can report a cell load measurement result, and other EMSs can forward the cell load measurement result to this EMS. In an example implementation, acquiring the cell load measurement result reported by each eNB in the energy saving and compensation group includes: acquiring a cell load measurement result reported by at least one eNB, belonging to a first EMS, in all eNBs; and/or, acquiring a cell load measurement result forwarded by a second EMS and reported by at least one eNB, belonging to the second EMS, in all the eNBs.

In one implantation of the embodiments of the disclosure, a cell load measurement job, an energy saving and compensation policy and information about an energy saving and compensation group can also be acquired from the NMS. The information includes: an identifier of the energy saving and compensation group, identifiers of energy saving cells and identifiers of compensation cells. A configuration parameter of the energy saving and compensation policy includes: a load threshold enabling each energy saving cell to enter an energy saving state, a load threshold enabling each compensation cell to enter a compensation state, and a load threshold enabling each compensation cell to quit the compensation state.

The method in the embodiments of the disclosure can be implemented by means of a conventional device in a communication network or an added device for implementing the method. Optionally, the method can be implemented independently by the EMS or the NMS, or can be completed by means of functions of the EMS and the NMS. The embodiments of the disclosure do not limit thereto. Any predictable mode can be adopted by those skilled in the art on a basis of understanding the method in the embodiments of the disclosure.

In the embodiments of the disclosure, controlling the energy saving state of the energy saving and compensation group for each energy saving cell and each compensation cell may be: indicating, when the energy saving and compensation group enters the energy saving state, each energy saving cell to enter the energy saving state, and indicating, when the energy saving and compensation group enters the energy saving state, the corresponding compensation cell to enter the compensation state; and indicating, when the energy saving and compensation group enters a non-energy saving state, each energy saving cell to quit the energy saving state, and indicating, when the energy saving and compensation group enters the non-energy saving state, the corresponding compensation cell to quit the compensation state.

Figure 4:
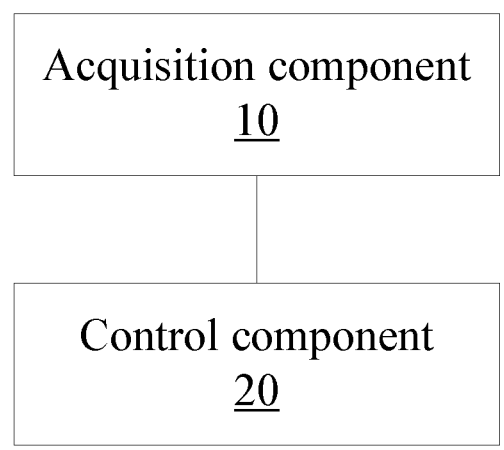
FIG. 4 is a structural block diagram of a device for controlling energy saving and compensation according to an embodiment of the disclosure.

FIG. 4 is a structural block diagram of an device for controlling energy saving and compensation according to an embodiment of the disclosure. As shown in FIG. 4, the device mainly includes: an acquisition component 10 and a control component 20, wherein the acquisition component 10 is configured to acquire cell load measurement results of all cells in an energy saving and compensation group, the energy saving and compensation group including energy saving cells and compensation cells; and the control component 20 is connected with the acquisition component 10 and configured to control, according to the cell load measurement results and an energy saving and compensation policy, at least one cell in the energy saving and compensation group to enter or quit energy saving.

By means of the embodiments of the disclosure, cell load measurement results of all cells in an energy saving and compensation group are acquired, and according to the cell load measurement results and an energy saving and compensation policy, an energy saving state of the energy saving and compensation group is controlled, such that energy saving and compensation can be globally controlled, thereby reducing the complexity of determining energy saving and compensation cells.

In one implementation of the embodiments of the disclosure, the acquisition component 10 may include: a sending element, configured to send a cell load measurement job to the energy saving and compensation group; and a receiving element, configured to receive the cell load measurement results reported in response to the cell load measurement job.

In one implementation of the embodiments of the disclosure, a cell load measurement job can be sent to an eNB corresponding to each cell. After receiving the cell load measurement job, each eNB can measure a cell load (which may have been previously measured, certainly) and report a cell load measurement result.

In the embodiments of the disclosure, the cell measurement job can be directly sent to each eNB, or the cell measurement job can be sent by means of an EMS. However, it is not limited thereto. In the case where all the eNBs belong to different EMSs, a cell load measurement result can be directly received by means of each EMS, a main EMS can be set in a plurality of EMSs, and the main EMS can receive cell load measurement results reported by other EMSs and report the received cell load measurement results and an own cell load measurement result.

In the embodiments of the disclosure, each eNB can periodically perform measurement and report the cell load measurement result. That is, in the embodiments of the disclosure, the eNBs can actively report the measurement results, or each eNB can be actively requested to report the measurement result. Certainly, after being actively requested, each eNB can report the cell load measurement result for many times.

The embodiments of the disclosure do not limit acquisition modes for the cell load measurement results. Any modes, predictable by those skilled in the art, of acquiring the cell load measurement result of each eNB are allowed.

The cell load measurement results can be represented by parameters in the related art, which is not limited in the embodiments of the disclosure. Those skilled in the art can determine the parameters for representing cell loads with reference to related communication standards and communication technologies in conjunction with actually required or actually applied systems.

In one implantation of the embodiments of the disclosure, the acquisition component 10 is further configured to acquire information about the energy saving and compensation group, wherein the information may include, but is not limited to, an identifier of the energy saving and compensation group, identifiers of the energy saving cells, identifiers of the compensation cells, and a state of the energy saving and compensation group.

In one implantation of the embodiments of the disclosure, the device may further include: a configuration component, configured to configure the energy saving and compensation group, and determine cells serving as the energy saving cells and cells serving as the compensation cells in the energy saving and compensation group.

Optionally, cells capable of entering the energy saving states, cells capable of entering the compensation states and an energy saving and compensation coverage range in an off-peak situation can be determined in network planning and optimization according to distribution situations, including a time dimension, a geographic position dimension and other aspects, of each cell load in an area on the premise of ensuring that the total energy consumption in the area is reduced. That is, cells serving as the energy saving cells and cells serving as the compensation cells can be pre-set; and when conditions are satisfied, the energy saving cells enter the energy saving states, the compensation cells enter the compensation states, and the compensation cells cover the range covered by the energy saving cells.

In one implantation of the embodiments of the disclosure, the energy saving and compensation policy includes: a load threshold, enabling each energy saving cell to enter an energy saving state, wherein a corresponding load threshold enabling to enter the energy saving state is set for each energy saving cell; a load threshold, enabling each compensation cell to enter a compensation state, wherein a corresponding load threshold enabling to enter the compensation state is set for each compensation cell; a load threshold, enabling each compensation cell to quit the compensation state, wherein a corresponding load threshold enabling to quit the compensation state is set for each compensation cell; and a configuration parameter of each compensation cell in the compensation state.

Optionally, the configuration parameter includes: at least one of transmitting power, an antenna inclination angle, an antenna height, a neighbour list and a new ECGI in the compensation state; and/or a new network management identifier (DN) of each compensation cell.

In one implantation of the embodiments of the disclosure, the control component 20 may include: a first determination element, configured to determine, when the state of the energy saving and compensation group is a non-energy saving state, that cell load values of all the energy saving cells are lower than the corresponding load thresholds enabling the energy saving cells to enter the energy saving states and cell load values of all the compensation cells are lower than the corresponding load thresholds enabling the compensation cells to enter the compensation states; and a first control element, configured to control the cells in the energy saving and compensation group to enter energy saving, and set the state of the energy saving and compensation group as the energy saving state.

In one implantation of the embodiments of the disclosure, the control component 20 may include: a second determination element, configured to determine, when the state of the energy saving and compensation group is the energy saving state, that the cell load values of all the compensation cells are lower than the corresponding load thresholds enabling the compensation cells to quit the compensation states; and a second control element, configured to control the cells in the energy saving and compensation group to quit energy saving, and set the state of the energy saving and compensation group as the non-energy saving state.

In one implantation of the embodiments of the disclosure, entering, by the cells in the energy saving and compensation group, energy saving includes: entering, by all the energy saving cells, the energy saving states, and entering, by all the compensation cells, the compensation states; and/or, quitting, by the cells in the energy saving and compensation group, energy saving includes: quitting, by all the energy saving cells, the energy saving states, and quitting, by all the compensation cells, the compensation states.

It can be predicted that the device can be implemented by means of a computer program element, the computer program element can be stored in a storage medium, and the computer program element is executed by a processor in a device.

In the embodiments of the disclosure, the device can be located in an added device, or can be located in an NMS or an EMS. Those skilled in the art can predict how to set a corresponding communication interface so as to implement communications between eNBs and other devices, which will not be elaborated in the embodiments of the disclosure.

By taking implementation of the method in a TMN including an NMS or an EMS as an example and co-executing the method by the EMS and the NMS, the embodiments of the disclosure are described.

In the embodiments of the disclosure, the method determines cells capable of entering energy saving states, cells capable of entering compensation states and an energy saving and compensation coverage range in an off-peak situation in network planning and optimization according to distribution situations, including a time dimension, a geographic position dimension and other aspects, of each cell load in an area on the premise of ensuring that the total energy consumption in the area is reduced, and controls energy saving and compensation by means of a management system. The method enables an energy saving effect to be more easily evaluated and to be further ensured.

The method for controlling energy saving and compensation in the example implementation enables an energy saving effect to be more easily evaluated and to be further ensured. In the example implementation, Configuration parameters for energy saving and compensation includes information about an energy saving and compensation group and an energy saving and compensation policy, wherein the energy saving and compensation group includes: a serial number of the energy saving and compensation group, a state of the energy saving and compensation group, a list of identifiers of energy saving cells and a list of identifiers of compensation cells. Thresholds of the energy saving and compensation group include: a load threshold enabling each energy saving cell to enter an energy saving state, a load threshold enabling each compensation cell to enter an energy saving and compensation state, a load threshold enabling each compensation cell to quit the energy saving and compensation state, and configuration parameters of each compensation cell in a compensation state.

The management system determines, according to a current state of the energy saving and compensation group, the cell load measurement results and the thresholds of the energy saving and compensation group, conditions, enabling the energy saving and compensation group to enter energy saving, as:

1) the current state of the energy saving and compensation group is a non-energy saving state;

2) a cell load value of each energy saving cell in an energy saving cell list must be lower than the load threshold enabling the energy saving cell to enter the energy saving state; and 3) load values of all neighbour cells, in a compensation cell list, of each energy saving cell in the energy saving cell list must be lower than a load threshold enabling the neighbour cell to enter the energy saving and compensation state.

When the three conditions are all satisfied, the energy saving and compensation group enters energy saving, and the state of the energy saving and compensation group is set as the energy saving state. Controlling the energy saving and compensation group to enter energy saving, namely controlling the cells in the energy saving and compensation group to enter energy saving, includes: controlling each energy saving cell to enter the energy saving state, and controlling each compensation cell to enter the energy saving and compensation state.

The management system determines, according to the current state of the energy saving and compensation group, the cell load measurement results and the thresholds of the energy saving and compensation group, conditions, enabling the energy saving and compensation group to quit energy saving, as:

1) the current state of the energy saving and compensation group is the energy saving state; and 2) a load value of a compensation cell in the compensation cell list is higher than the load threshold enabling the compensation cell to quit the energy saving and compensation state.

When the two conditions are both satisfied, the energy saving and compensation group quits energy saving, and the state of the energy saving and compensation group is set as the non-energy saving state. Controlling the energy saving and compensation group to quit energy saving, namely controlling the cells in the energy saving and compensation group to quit energy saving, includes: controlling each energy saving cell to quit the energy saving state, and controlling each compensation cell to quit the energy saving and compensation state, and converting the state into the non-energy saving state. The non-energy saving state is a default state of the energy saving and compensation group.

The example implementations of the embodiments of the disclosure will be described below.

Example Implementation 1

In the example implementation, suppose an attached eNB of each energy saving cell and an attached eNB of each compensation cell are managed by an identical EMS.

Figure 5:
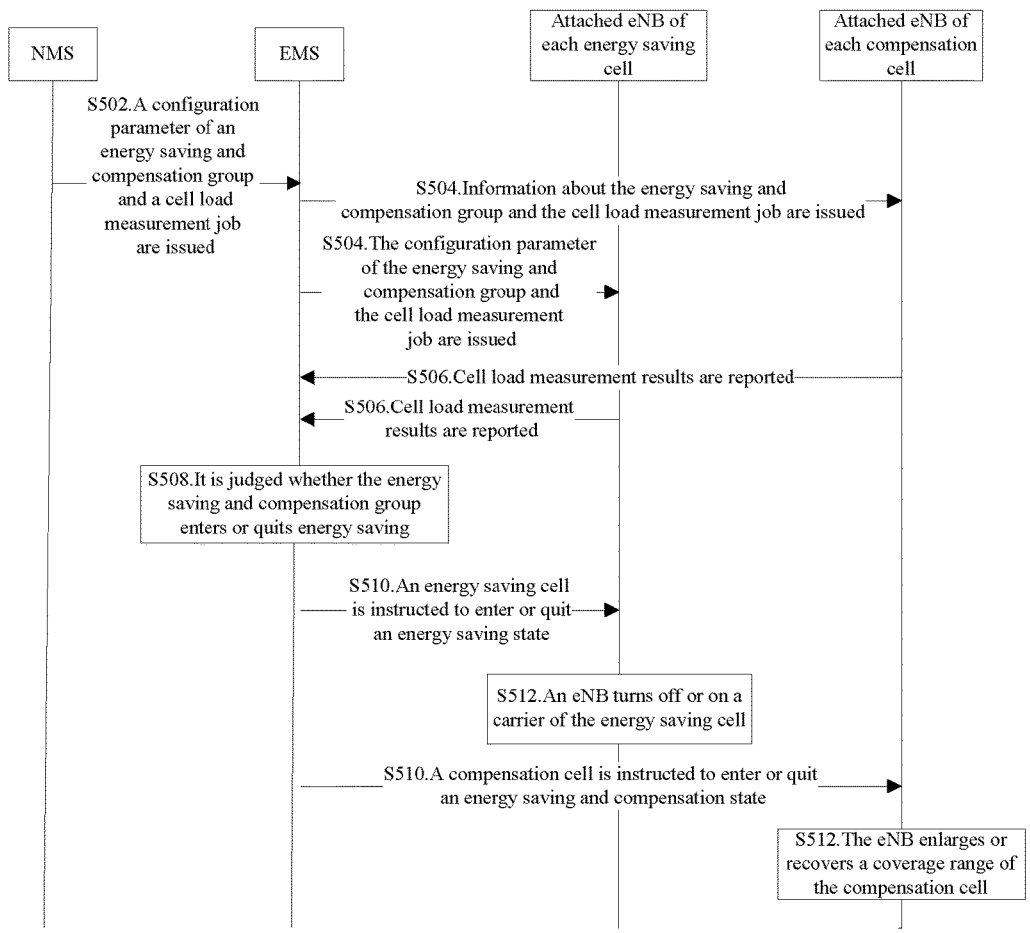
FIG. 5 is a flowchart of a method for controlling energy saving and compensation according to a first example embodiment of the disclosure.

FIG. 5 is a flowchart of a method for controlling energy saving and compensation according to a first example embodiment of the disclosure. As shown in FIG. 5, the method includes Step S502 to Step S514.

Step S502: An NMS sends a configuration parameter for energy saving and compensation and a cell load measurement job to an EMS by means of an Itf-N.

Step S504: The EMS receives the configuration parameter for energy saving and compensation, and sends information about an energy saving and compensation group and the cell load measurement job to an attached eNB of each energy saving cell and an attached eNB of each compensation cell.

Step S506: The attached eNB of each energy saving cell and the attached eNB of each compensation cell report cell load measurement results to the attached EMS.

Step S508: The EMS judges whether the energy saving and compensation group enters or quits energy saving according to a current state of the energy saving and compensation group, the cell load measurement results and thresholds in an energy saving and compensation policy.

Step S510: When a determination result indicates that the energy saving and compensation group enters energy saving, the EMS instructs the attached eNB of each energy saving cell to allow the cell to enter an energy saving state, and instructs the attached eNB of each compensation cell to allow the compensation cell to enter an energy saving and compensation state. When the determination result indicates that the energy saving and compensation group quits energy saving, the EMS instructs the attached eNB of each energy saving cell to allow the energy saving cell to quit the energy saving state, and instructs the attached eNB of each compensation cell to allow the compensation cell to quit the energy saving and compensation state.

Step S512: The attached eNB of each energy saving cell receives an instruction of allowing the energy saving cell to enter the energy saving state, reduces pilot channel power of a carrier of the energy saving cell to zero or turns off the carrier of the energy saving cell; and the attached eNB of each compensation cell receives an instruction of allowing the cell to enter the energy saving and compensation state, and enlarges the coverage range of the cell according to transmitting power and an antenna inclination angle in a configuration parameter of the corresponding compensation cell in a compensation state.

Step S514: The attached eNB of each energy saving cell receives an instruction of allowing the cell to quit the energy saving state, recovers the pilot channel power of the carrier of the energy saving cell or turns on the carrier of the energy saving cell; and the attached eNB of each compensation cell receives an instruction of allowing the compensation cell to quit the energy saving and compensation state, and the eNB recovers the coverage range of the cell according to an original configuration parameter of the compensation cell.

Example Implementation 2

In the example implementation, suppose an attached eNB of each energy saving cell and an attached eNB of each compensation cell are managed by different EMSs.

Figure 6:
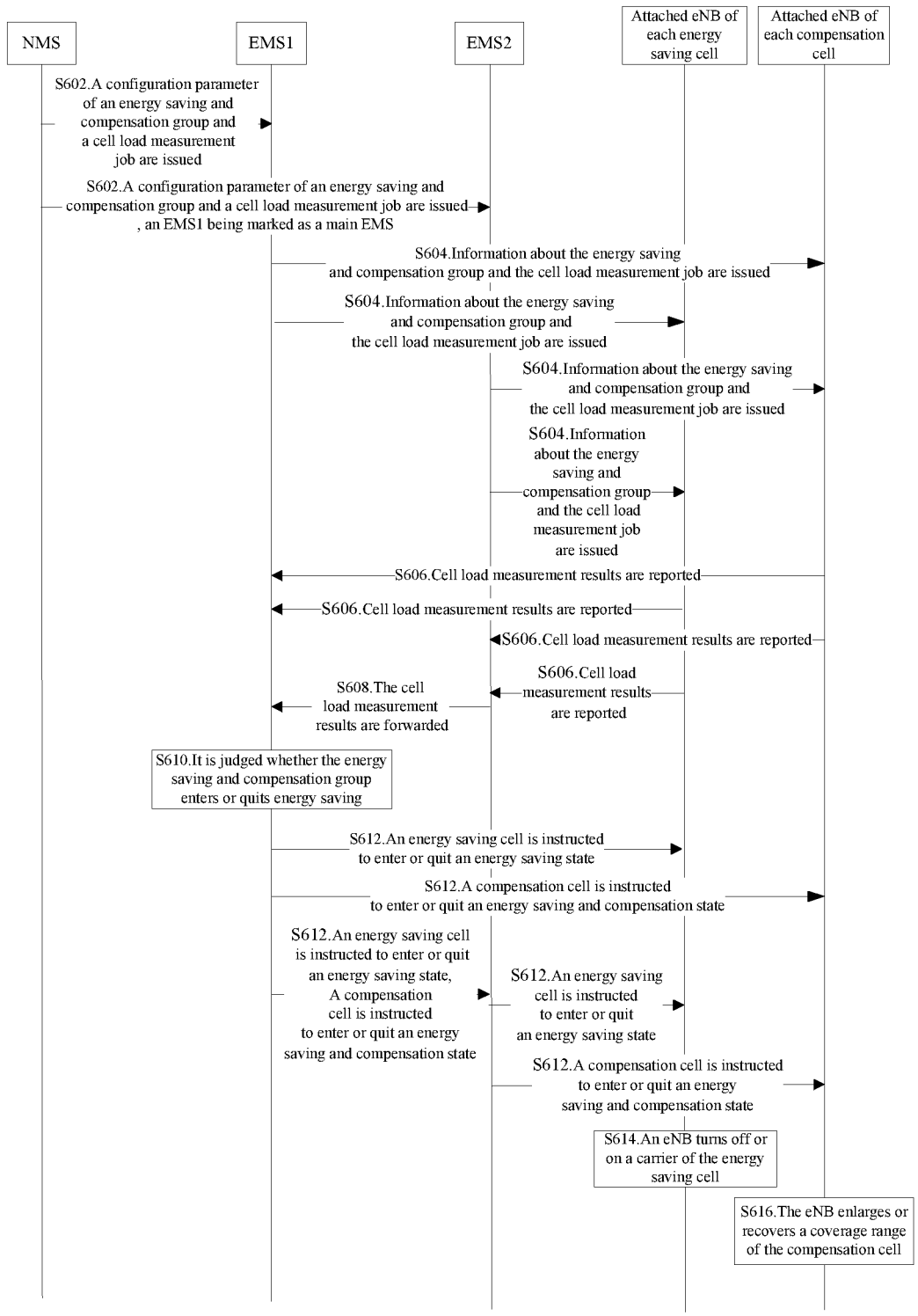
FIG. 6 is a flowchart of a method for controlling energy saving and compensation according to a second example embodiment of the disclosure.

FIG. 6 is a flowchart of a method for controlling energy saving and compensation according to a first example embodiment of the disclosure. As shown in FIG. 6, the method includes Step S602 to Step S616.

Step S602: An NMS sends a configuration parameter for energy saving and compensation and a cell load measurement job to an EMS 1 and an EMS 2 by means of an Itf-N. The NMS assigns the EMS 1 as a main EMS configured to be in charge of executing a process of judging whether an energy saving and compensation group enters or quits energy saving, and sends information indicating that the EMS 1 serves as the main EMS to the EMS 2 by means of the Itf-N.

Step S604: The EMS 1 and the EMS 2 receive the configuration parameter for energy saving and compensation, and sends information about the energy saving and compensation group and the cell load measurement job to an attached eNB of each energy saving cell and an attached eNB of each compensation cell.

Step S606: The attached eNB of each energy saving cell and the attached eNB of each compensation cell report cell load measurement results to the attached EMS, namely the EMS 1 or the EMS 2.

Step S608: The EMS 2 forwards cell load information reported by the corresponding eNB to the EMS 1.

Step S610: The EMS 1 judges whether the energy saving and compensation group enters or quits energy saving according to a current state of the energy saving and compensation group, the cell load measurement results and thresholds in an energy saving and compensation policy.

Step S612: If a determination result indicates that the energy saving and compensation group enters energy saving, the EMS 1 instructs the eNB and the energy saving cell governed by the EMS 2 to enter the energy saving states, and instructs the governed compensation cell to enter the energy saving and compensation state. If the determination result indicates that the energy saving and compensation group quits energy saving, the EMS 1 instructs the eNB and the energy saving cell governed by the EMS2 to quit the energy saving states, and instructs the governed compensation cell to quit the energy saving and compensation state; and the EMS 2 forwards the instructions to the attached eNB of each energy saving cell and the attached eNB of each compensation cell.

Step S614: The attached eNB of each energy saving cell receives an instruction of allowing the energy saving cell to enter the energy saving state, reduces pilot channel power of a carrier of the energy saving cell to zero or turns off the carrier of the energy saving cell; and the attached eNB of each compensation cell receives an instruction of allowing the cell to enter the energy saving and compensation state, and enlarges the coverage range of the cell according to transmitting power and an antenna inclination angle in a configuration parameter of the corresponding compensation cell in a compensation state.

Step S616: The attached eNB of each energy saving cell receives an instruction of allowing the cell to quit the energy saving state, recovers the pilot channel power of the carrier of the energy saving cell or turns on the carrier of the energy saving cell; and the attached eNB of each compensation cell receives an instruction of allowing the compensation cell to quit the energy saving and compensation state, and the eNB recovers the coverage range of the cell according to an original configuration parameter of the compensation cell.

Example Implementation 3

In the example implementation, suppose an attached eNB of each energy saving cell and an attached eNB of each compensation cell are managed by different EMSs.

Figure 7:
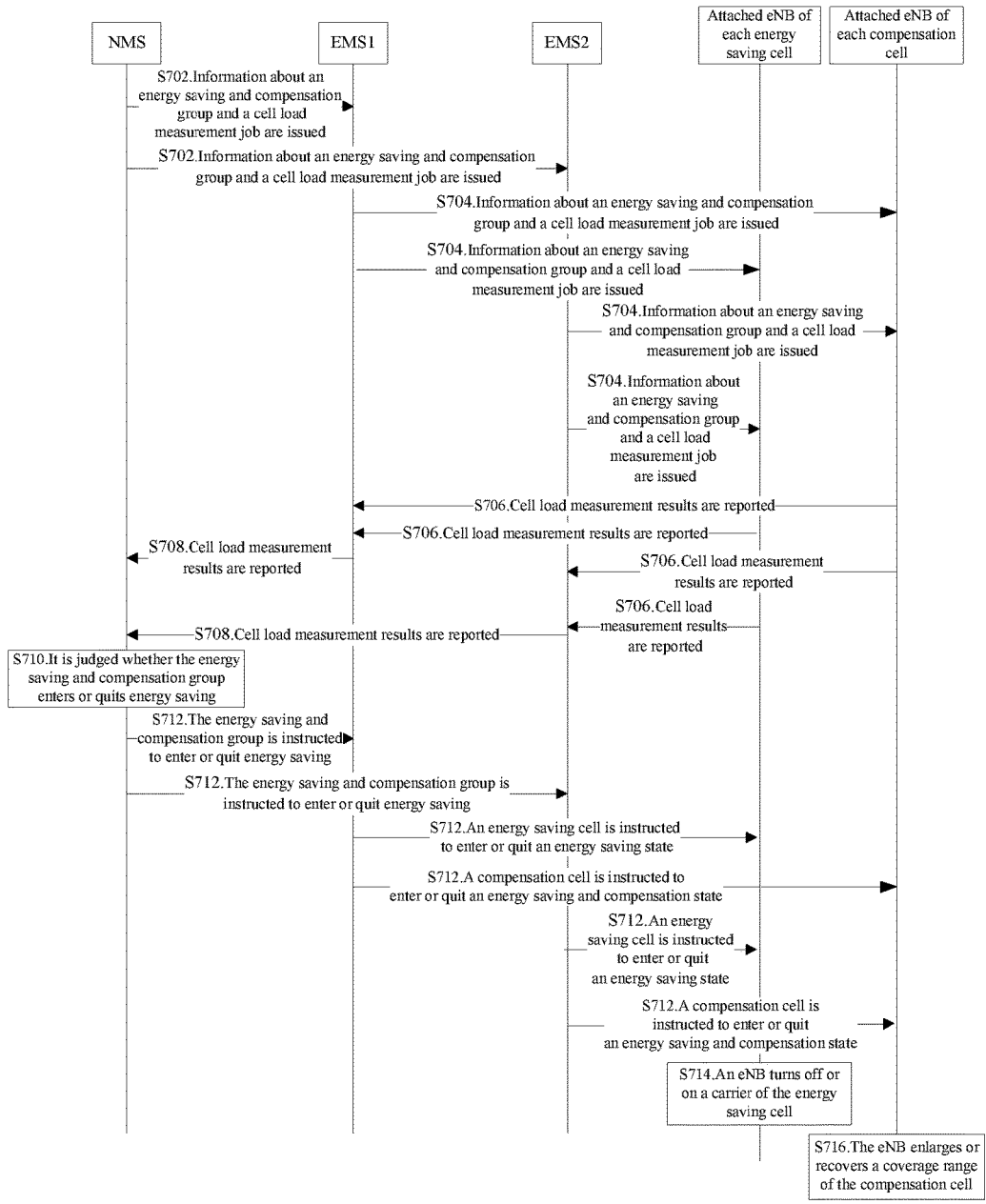
FIG. 7 is a flowchart of a method for controlling energy saving and compensation according to a third example embodiment of the disclosure.

FIG. 7 is a flowchart of a method for controlling energy saving and compensation according to a third example embodiment of the disclosure. As shown in FIG. 7, the method includes Step S702 to Step S716.

Step S702: An NMS sends information about an energy saving and compensation group and a cell load measurement job to an EMS 1 and an EMS 2 by means of an Itf-N.

Step S704: The EMS 1 and the EMS 2 receive the information about the energy saving and compensation group and the cell load measurement job, and sends the information about the energy saving and compensation group and the cell load measurement job to an attached eNB of each energy saving cell and an attached eNB of each compensation cell.

Step S706: The attached eNB of each energy saving cell and the attached eNB of each compensation cell report cell load measurement results to the attached EMS, namely the EMS 1 or the EMS 2.

Step S708: The EMS 1 and the EMS 2 report the reported cell load measurement results to the NMS.

Step S710: The NMS judges whether the energy saving and compensation group enters or quits energy saving according to a current state of the energy saving and compensation group, the cell load measurement results and thresholds in an energy saving and compensation policy.

Step S712: If a determination result indicates that the energy saving and compensation group enters energy saving, the NMS instructs the energy saving cells governed by the EMS 1 and the EMS 2 to enter the energy saving states, and instructs the governed compensation cells to enter the energy saving and compensation states. If the determination result indicates that the energy saving and compensation group quits energy saving, the NMS instructs the energy saving cells governed by the EMS 1 and the EMS 2 to quit the energy saving states, and instructs the governed compensation cells to quit the energy saving and compensation states; and the EMS 1 and the EMS 2 forward the instructions to the attached eNB of each energy saving cell and the attached eNB of each compensation cell.

Step S714: The attached eNB of each energy saving cell receives an instruction of allowing the energy saving cell to enter the energy saving state, reduces pilot channel power of a carrier of the energy saving cell to zero or turns off the carrier of the energy saving cell; and the attached eNB of each compensation cell receives an instruction of allowing the cell to enter the energy saving and compensation state, and enlarges the coverage range of the cell according to transmitting power and an antenna inclination angle in a configuration parameter of the corresponding compensation cell in a compensation state.

Step S716: The attached eNB of each energy saving cell receives an instruction of allowing the cell to quit the energy saving state, recovers the pilot channel power of the carrier of the energy saving cell or turns on the carrier of the energy saving cell; and the attached eNB of each compensation cell receives an instruction of allowing the compensation cell to quit the energy saving and compensation state, and the eNB recovers the coverage range of the cell according to an original configuration parameter of the compensation cell.

Figure 8:
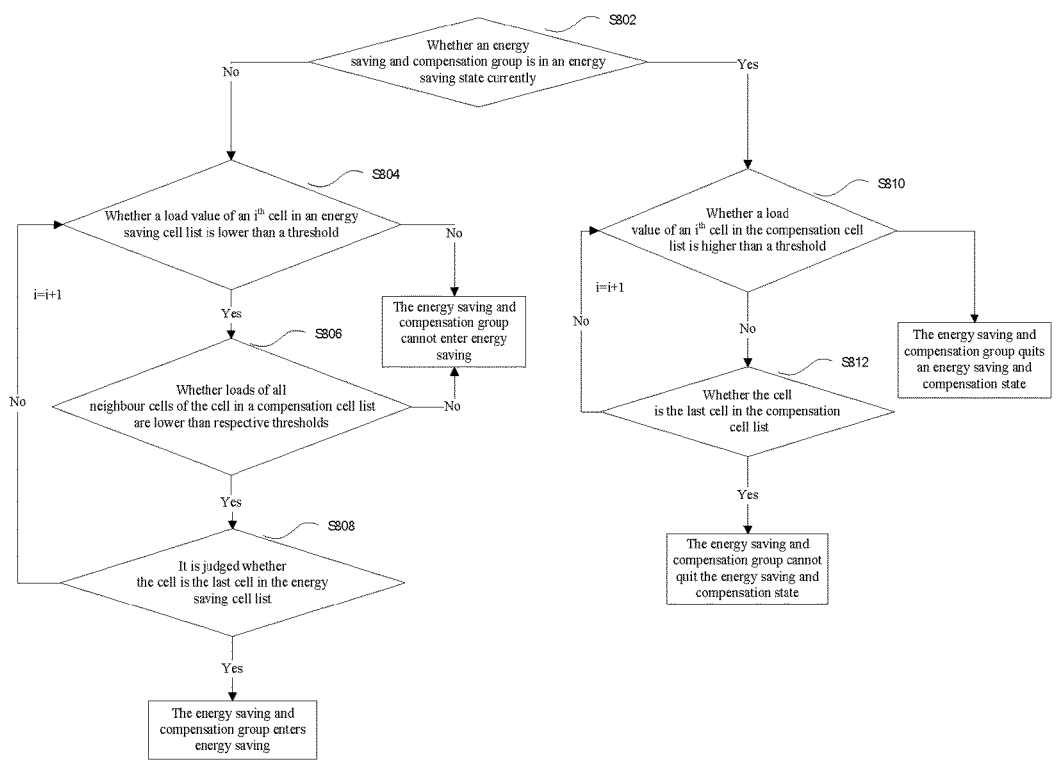
FIG. 8 is a flowchart of a method for judging whether an energy saving and compensation group enters or quits energy saving according to an example embodiment of the disclosure.

As shown in FIG. 8, the process of judging, by the EMS or the NMS, whether the energy saving and compensation group enters or quits energy saving according to the current state of the energy saving and compensation group, the cell load measurement results and the thresholds in the energy saving and compensation policy in Step S508, Step S610 and Step S710 can be divided into Step S802 to Step S812.

Step S802: It is judged whether an energy saving and compensation group is in an energy saving state currently, if the energy saving and compensation group is not in the energy saving state currently, Step S804 is executed to judge whether the energy saving and compensation group enters energy saving, and if the energy saving and compensation group is in the energy saving state currently, Step S810 is executed to judge whether the energy saving and compensation group quits energy saving.

Step S804: It is judged whether a load of an $i^{th}$ cell (i=1, 2, . . . , N, N being the length of an energy saving cell list) in the energy saving cell list is lower than a load threshold enabling to enter the energy saving state, if the load of the $i^{th}$ cell in the energy saving cell list is not lower than the load threshold enabling to enter the energy saving state, the energy saving and compensation group cannot enter energy saving, and if the load of the $i^{th}$ cell in the energy saving cell list is lower than the load threshold enabling to enter the energy saving state, Step S806 is executed.

Step S806: All neighbour cells of the cell in a compensation cell list are determined, it is judged whether a load value of each neighbour cell is lower than a load threshold enabling the neighbour cell to enter the energy saving state, if the load value of each neighbour cell is not lower than the load threshold enabling the neighbour cell to enter the energy saving state, the energy saving and compensation group cannot enter energy saving, and if the load value of each neighbour cell is lower than the load threshold enabling the neighbour cell to enter the energy saving state, Step S808 is executed.

Step S808: It is judged whether the cell is the last cell in the energy saving cell list, that is, it is judged whether i is equal to N; if the cell is not the last cell in the energy saving cell list, Step S804 is re-executed, and an $i+1^{th}$ cell in the energy saving cell list is continuously judged; and if the cell is the last cell in the energy saving cell list, the energy saving and compensation group enters energy saving.

Step S810: It is judged whether a load of an $i^{th}$ cell (i=1, 2, . . . , K, K being the length of a compensation cell list) in the compensation cell list is higher than a load threshold enabling to quit the energy saving and compensation state, if the load of the $i^{th}$ cell in the compensation cell list is higher than the load threshold enabling to quit the energy saving and compensation state, the energy saving and compensation group quits energy saving, and if the load of the $i^{th}$ cell in the compensation cell list is not higher than the load threshold enabling to quit the energy saving and compensation state, Step S812 is executed.

Step S812: It is judged whether the cell is the last cell in the compensation cell list, that is, it is judged whether i is equal to K; if the cell is not the last cell in the compensation cell list, Step S810 is re-executed, and an $i+1^{th}$ cell in the compensation cell list is continuously judged; and if the cell is the last cell in the compensation cell list, the energy saving and compensation group does not quit energy saving.

In the above three example implementations, the process of issuing, by the NMS or the EMS, the configuration parameter for energy saving and compensation or energy saving and compensation information and the cell load measurement job to the EMS or the eNBs can be separated from the subsequent steps, the subsequent steps shall be continuously executed after an energy saving and compensation function is started, issuing can be carried out once when the energy saving and compensation function is deployed, and the management system can update part of parameters for energy saving and compensation in a process that the subsequent steps are executed.

Figure 9:
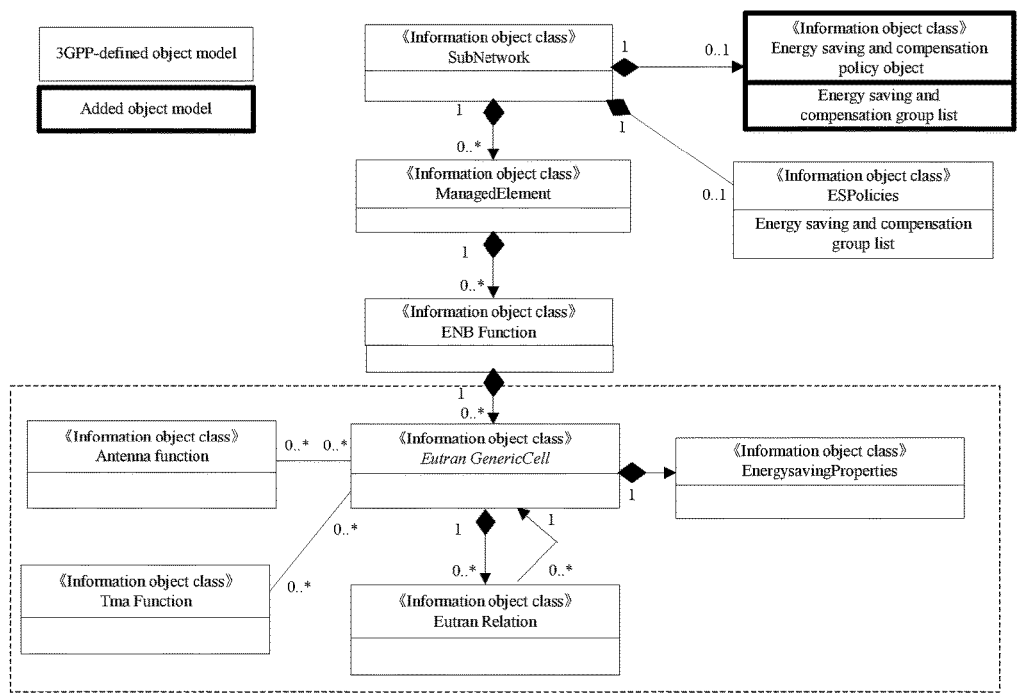
FIG. 9 is a schematic diagram of a model of a configuration parameter of an energy saving and compensation policy according to an example embodiment of the disclosure.

Optionally, the configuration parameter for energy saving and compensation has the following two modelling modes in a management information base of the management system. As shown in FIG. 9, the modes may include:

Mode 1: adding a new energy saving and compensation policy object (ESCompensationPolicies) to an information object class, the object being contained under a subnetwork object and inherited from a Top object, the object at least containing an ESCompensationGroupList property; and Mode 2: adding an ESCompensationGroupList property to a conventional information object class ESPolicies, wherein the property is valid only when the object ESPolicies is contained under the subnetwork object.

Under the two modes, each element of the ESCompensationGroupList property corresponds to an energy saving and compensation group, each element containing information about an energy saving and compensation group and an energy saving and compensation policy.

A configuration parameter of each compensation cell, in the energy saving and compensation policy, in a compensation state may be as follows. 1) The configuration parameter is a list of all parameters such as transmitting power, an antenna inclination angle, an antenna height, a neighbour list, and a new ECGI in the compensation state. 2) When a configuration parameter of a new DN compensation cell of the compensation cell in the compensation state is a new DN of the compensation cell, it is shown that the compensation cell is regarded as a new cell after entering an energy saving and compensation state, a management system needs to create a corresponding cell object instance for this new cell according to a conventional 3GPP cell object and an association relation thereof, a property value and an associated object property thereof include the configuration parameter of the cell in the energy saving and compensation state, and a DN of a new cell object instance is the new DN of the compensation cell. As shown in Figure, objects, for which new instances need to be created, at least include objects in dotted lines in FIG. 9.

No matter which modelling mode is adopted, it is necessary to add a property energy saving and compensation group identifier to a cell object so as to represent an energy saving and compensation group to which a cell is attached.

When the Mode 1 is adopted for modelling, in the first two steps in the example embodiment 1 and the example embodiment 2, the specific step of issuing a configuration parameter of an energy saving and compensation policy from an Itf-N is as follows.

1) An NMS sends a command for creating an energy saving and compensation policy object to an EMS, command parameters including an energy saving and compensation policy object name ESCompensationPolicies, an energy saving and compensation object instance DN and an energy saving and compensation policy object property value; and the NMS sends a command for setting a serial number of a cell property energy saving and compensation group to the EMS, command parameters including a cell object instance DN, a property name energy saving and compensation group identifier to be modified, a modified value and a modification mode.

2) The EMS receives the command for creating an energy saving and compensation policy object, and adds an energy saving and compensation policy object instance to a local management information base according to the command parameters.

The EMS receives a command for setting an energy saving and compensation group identifier property of a cell, and updates a property value according to a modification mode in the command.

When the Mode 2 is adopted for modelling, in the first two steps in the example embodiment 1 and the example embodiment 2, the specific step of issuing a configuration parameter of an energy saving and compensation policy from an Itf-N is as follows.

1) An NMS sends a command for setting an energy saving and compensation group list property to an EMS, command parameters including an ESPolicies object instance DN, a property name energy saving and compensation group list to be modified, a modified value and a modification mode; and the NMS sends a command for setting a cell property energy saving and compensation group identifier to the EMS, command parameters including a cell object instance DN, a property name energy saving and compensation group serial number to be modified, a modified value and a modification mode.

2) The EMS receives the command for creating an energy saving and compensation group list property of ESPolicies, and updates a property value of a property energy saving and compensation group list according to the modification mode in the command.

The EMS receives a command for setting an energy saving and compensation group serial number property of a cell, and updates a property value of a property energy saving and compensation group serial number according to a modification mode in the command.

If a compensation state configuration parameter of a compensation cell is only a new DN of the compensation cell, no matter which mode is adopted for modelling, in the first two steps in the example embodiment 1 and the example embodiment 2, the specific step of issuing a configuration parameter of an energy saving and compensation policy from an Itf-N further includes the steps as follows.

1) An NMS sends a command for creating a compensation cell object to an EMS, command parameters including a compensation cell object name EUtranCellFDD or EUtranCellTDD, a compensation cell object instance DN and a compensation cell object property value.

The NMS sends a command for creating a neighbour cell relation object to the EMS, command parameters including a neighbour cell relation object name EUtranRelation, a neighbour cell relation object instance DN and a neighbour cell relation object property.

The NMS sends a command for creating an antenna object to the EMS, command parameters including an antenna object name wireless function (AntennaFunction), an antenna object instance DN and an antenna object property.

The NMS sends a command for creating an EnergysavingProperties object to the EMS, command parameters including an energy saving property object name EnergysavingProperties, an EnergysavingProperties object instance DN and an EnergysavingProperties object property.

2) The EMS receives the commands for creating a compensation cell object, a neighbour cell relation object, an antenna object and an EnergysavingProperties object, and news a compensation cell object instance, a neighbour cell relation object instance and an antenna object instance to a local management information base according to the command parameters.

From the above descriptions, it can be seen that the disclosure achieves the technical effects as follows. Cell load measurement results of all cells in an energy saving and compensation group are acquired, the energy saving and compensation group including pre-set energy saving cells and pre-set compensation cells; and according to the cell load measurement results and an energy saving and compensation policy, an energy saving and compensation state of the energy saving and compensation group is controlled, such that energy saving and compensation can be globally controlled, thereby reducing the complexity of determining energy saving and compensation cells. Pre-setting of the energy saving cells and the compensation cells enables an effect to be more easily evaluated and to be further ensured.

Obviously, those skilled in the art shall understand that all components or all steps in the disclosure may be implemented using a general calculation device, may be centralized on a single calculation device or may be distributed on a network composed of a plurality of calculation devices. Optionally, they may be implemented using executable program codes of the calculation devices. Thus, they may be stored in a storage device and executed by the calculation devices, the shown or described steps may be executed in a sequence different from this sequence under certain conditions, or they are manufactured into each integrated circuit component respectively, or a plurality of components or steps therein is manufactured into a single integrated circuit component. Thus, the disclosure is not limited to a combination of any specific hardware and software.

The above is only the example embodiments of the disclosure, and is not used to limit the disclosure. There may be various modifications and variations in the disclosure for those skilled in the art. Any modifications, equivalent replacements, improvements and the like within the spirit and principle of the disclosure shall fall within the protective scope of the disclosure.

INDUSTRIAL APPLICABILITY

The technical solutions provided by the embodiments of the disclosure can be applied to the field of communications. Cell load measurement results of all cells in an energy saving and compensation group are acquired, and according to the cell load measurement results and an energy saving and compensation policy, the cells in the energy saving and compensation group are controlled to enter or quit energy saving, such that energy saving and compensation can be globally controlled, thereby reducing the complexity of determining energy saving and compensation cells.

What is claimed is:

1. A method for controlling energy saving and compensation, comprising:
   acquiring cell load measurement results of all cells in an energy saving and compensation group, wherein the energy saving and compensation group comprises energy saving cells and compensation cells; and
   controlling, according to the cell load measurement results and an energy saving and compensation policy, at least one cell in the energy saving and compensation group to enter or quit energy saving;
   wherein the energy saving and compensation policy comprises: a load threshold, enabling each energy saving cell to enter an energy saving state, wherein a corresponding load threshold enabling to enter the energy saving state is set for each energy saving cell; a load threshold, enabling each compensation cell to enter a compensation state, wherein a corresponding load threshold enabling to enter the compensation state is set for each compensation cell; a load threshold, enabling each compensation cell to quit the compensation state, wherein a corresponding load threshold enabling to quit the compensation state is set for each compensation cell; and a configuration parameter of each compensation cell in the compensation state.

2. The method as claimed in claim 1, wherein acquiring the cell load measurement results of all the cells in the energy saving and compensation group comprises:
   sending a cell load measurement job to the energy saving and compensation group; and
   receiving the cell load measurement results reported in response to the cell load measurement job.

3. The method as claimed in claim 1, further comprising:
   acquiring information about the energy saving and compensation group, the information comprising: an identifier of the energy saving and compensation group, identifiers of the energy saving cells, identifiers of the compensation cells, and a state of the energy saving and compensation group.

4. The method as claimed in claim 1, wherein before acquiring the cell load measurement results of all the cells in the energy saving and compensation group, the method further comprises:
   configuring the energy saving and compensation group, and determining cells serving as the energy saving cells and cells serving as the compensation cells in the energy saving and compensation group.

5. The method as claimed in claim 1, wherein the configuration parameter of each compensation cell in the compensation state comprises:
   at least one of transmitting power, an antenna inclination angle, an antenna height, a neighbour list and a new Evolved universal terrestrial radio access network Cell Global Identifier (ECGI) in the compensation state; and/or
   a new network management identifier (DN) of each compensation cell.

6. The method as claimed in claim 1, wherein controlling the cells in the energy saving and compensation group to enter or quit energy saving according to the cell load measurement results and the energy saving and compensation policy comprises: when a state of the energy saving and compensation group is a non-energy saving state,
   determining that cell load values of all the energy saving cells are lower than the corresponding load thresholds enabling the energy saving cells entering the energy saving states and cell load values of all the compensation cells are lower than the corresponding load thresholds enabling the compensation cells entering the compensation states; and
   controlling the cells in the energy saving and compensation group to enter energy saving, and setting the state of the energy saving and compensation group as the energy saving state.

7. The method as claimed in claim 1, wherein controlling the cells in the energy saving and compensation group to enter or quit energy saving according to the cell load measurement results and the energy saving and compensation policy comprises: when the state of the energy saving and compensation group is the energy saving state,
   determining that the cell load values of all the compensation cells are lower than the corresponding load thresholds enabling the compensation cells to quit the compensation states; and otherwise,
   controlling the cells in the energy saving and compensation group to quit energy saving, and setting the state of the energy saving and compensation group as the non-energy saving state.

8. The method as claimed in any one of claim 1, wherein
controlling the cells in the energy saving and compensation group to enter energy saving comprises: controlling all the energy saving cells to enter the energy saving states, and controlling all the compensation cells to enter the compensation states; and/or
controlling the cells in the energy saving and compensation group to quit energy saving comprises: controlling all the energy saving cells to quit the energy saving states, and controlling all the compensation cells to quit the compensation states.

9. A device for controlling energy saving and compensation, comprising a processor, configured to perform programming components stored in a memory, wherein the programming components comprise:
   an acquisition component, configured to acquire cell load measurement results of all cells in an energy saving and compensation group, wherein the energy saving and compensation group comprises energy saving cells and compensation cells; and
   a control component, configured to control, according to the cell load measurement results and an energy saving and compensation policy, at least one cell in the energy saving and compensation group to enter or quit energy saving;
   wherein the energy saving and compensation policy comprises: a load threshold, enabling each energy saving cell to enter an energy saving state, wherein a corresponding load threshold enabling to enter the energy saving state is set for each energy saving cell; a load threshold, enabling each compensation cell to enter a compensation state, wherein a corresponding load threshold enabling to enter the compensation state is set for each compensation cell; a load threshold, enabling each compensation cell to quit the compensation state, wherein a corresponding load threshold enabling to quit the compensation state is set for each compensation cell; and a configuration parameter of each compensation cell in the compensation state.

10. The device as claimed in claim 9, wherein the acquisition component comprises:
   a sending element, configured to send a cell load measurement job to the energy saving and compensation group; and
   a receiving element, configured to receive the cell load measurement results reported in response to the cell load measurement job.

11. The device as claimed in claim 9, wherein the acquisition component is further configured to:
   acquire information about the energy saving and compensation group, the information comprising: an identifier of the energy saving and compensation group, identifiers of the energy saving cells, identifiers of the compensation cells, and a state of the energy saving and compensation group.

12. The device as claimed in claim 9, further comprising:
   a configuration component, configured to configure the energy saving and compensation group, and determine cells serving as the energy saving cells and cells serving as the compensation cells in the energy saving and compensation group.

13. The device as claimed in claim 9, wherein the configuration parameter of each compensation cell in the compensation state comprises:
   at least one of transmitting power, an antenna inclination angle, an antenna height, a neighbour list and a new Evolved universal terrestrial radio access network Cell Global Identifier (ECGI) in the compensation state; and/or
   a new network management identifier (DN) of each compensation cell.

14. The device as claimed in claim 9, wherein the control component comprises:
   a first determination element, configured to determine, when a state of the energy saving and compensation group is a non-energy saving state, that cell load values of all the energy saving cells are lower than the corresponding load thresholds enabling the energy saving cells entering the energy saving states and cell load values of all the compensation cells are lower than the corresponding load thresholds enabling the compensation cells entering the compensation states; and
   a first control element, configured to control the cells in the energy saving and compensation group to enter energy saving, and set the state of the energy saving and compensation group as the energy saving state.

15. The device as claimed in claim 9, wherein the control component comprises:
   a second determination element, configured to determine, when the state of the energy saving and compensation group is the energy saving state, that the cell load values of all the compensation cells are lower than the corresponding load thresholds enabling the compensation cells to quit the compensation states; and
   a second control element, configured to control, when the conditions of the second determination element are not satisfied, the cells in the energy saving and compensation group to quit energy saving, and set the state of the energy saving and compensation group as the non-energy saving state.

16. The device as claimed in any one of claim 9, wherein
controlling the cells in the energy saving and compensation group to enter energy saving comprises: controlling all the energy saving cells to enter the energy saving states, and controlling all the compensation cells to enter the compensation states; and/or
controlling the cells in the energy saving and compensation group to quit energy saving comprises: controlling all the energy saving cells to quit the energy saving states, and controlling all the compensation cells to quit the compensation states.

17. The method as claimed in claim 2, further comprising:
acquiring information about the energy saving and compensation group, the information comprising: an identifier of the energy saving and compensation group, identifiers of the energy saving cells, identifiers of the compensation cells, and a state of the energy saving and compensation group.

18. The device as claimed in claim 10, wherein the acquisition component is further configured to:
   acquire information about the energy saving and compensation group, the information comprising: an identifier of the energy saving and compensation group, identifiers of the energy saving cells, identifiers of the compensation cells, and a state of the energy saving and compensation group.

\* \* \* \* \*